(12) United States Patent
Kirkby et al.

(10) Patent No.: US 6,671,285 B1
(45) Date of Patent: Dec. 30, 2003

(54) METHOD FOR CHARGING IN A DATA COMMUNICATION NETWORK

(75) Inventors: Paul Anthony Kirkby, Old Harlow (GB); Robert John Dean, Bishop's Stortford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/117,594

(22) PCT Filed: Mar. 21, 1997

(86) PCT No.: PCT/GB97/00799

§ 371 (c)(1),
(2), (4) Date: Feb. 1, 1999

(87) PCT Pub. No.: WO97/35454

PCT Pub. Date: Sep. 25, 1997

(30) Foreign Application Priority Data

Mar. 21, 1996 (GB) .............................................. 9605923

(51) Int. Cl.[7] .................................................. H04J 3/16
(52) U.S. Cl. .................................... 370/468; 455/406
(58) Field of Search ............................... 370/261, 468, 370/360, 401, 353, 352, 230, 235, 238, 237; 379/112.01, 114.01, 114.07, 111; 455/406

(56) References Cited

U.S. PATENT DOCUMENTS

| | | | |
|---|---|---|---|
| 5,065,393 A | | 11/1991 | Sibbitt et al. ............... 379/112 |
| 5,148,474 A | | 9/1992 | Haralambopoulos et al. ........................ 379/111 |
| 5,303,297 A | * | 4/1994 | Hillis .......................... 379/63 |
| 5,420,914 A | | 5/1995 | Blumhardt .................. 379/114 |
| 5,623,488 A | * | 4/1997 | Svennevik et al. ......... 370/360 |
| 5,724,659 A | * | 3/1998 | Daniel et al. ............... 455/452 |
| 5,790,643 A | * | 8/1998 | Gordon et al. .............. 379/119 |
| 5,794,140 A | * | 8/1998 | Sawyer ....................... 455/408 |
| 5,862,203 A | * | 1/1999 | Wulkan et al. ............. 379/114 |
| 5,974,308 A | * | 10/1999 | Vedel .......................... 455/407 |
| 6,154,643 A | * | 11/2000 | Cox ............................. 455/406 |

FOREIGN PATENT DOCUMENTS

| | | | |
|---|---|---|---|
| EP | 0526118 A2 | 7/1992 | .......... H04M/17/02 |
| EP | 0647052 A1 | 9/1994 | ........... H04L/12/14 |

* cited by examiner

*Primary Examiner*—Chi Pham
*Assistant Examiner*—Alexander D. Boakye
(74) *Attorney, Agent, or Firm*—Barnes & Thornburg

(57) ABSTRACT

A network is disclosed for carrying calls between entities. Network resources which generate charges include means arranged to determine the charging rate for their use dynamically, and to transmit charging rate or tariff data representing a proposed or actual charging rate or tariff, or a change or proposed change thereto, through the network before and/or during the call to the entity or entities liable to the resource for the charges.

20 Claims, 3 Drawing Sheets

METHOD FOR CHARGING IN A DATA COMMUNICATION NETWORK

This invention relates data to communication networks in which the bandwidth reserved for or utilised by a call can vary during the call.

The invention may be applied broadly in networks providing a continuous flow of traffic of controllable bandwidth. The network may be asynchronous, data traffic being allowed to be transmitted in a bursty manner but having an "effective bandwidth" reserved for it. In an alternative, the network may be an n×64 kbits/s synchronous network where n can be varied to vary bandwidth.

The background to the invention will be explained in relation to a particular problem in one example of an asynchronous network, which is an Asynchronous Transfer Mode (ATM) network.

Although it is conventional to design non-blocking networks for telephone traffic and for narrow band data communication networks, a non-blocking network for broadband data networks would not be easily affordable. Given that from time to time, parts of a broadband network will become congested, a decision has to be made as to what to do on that occurrence. One option would be merely to refuse new calls. That used to be the practice in telephone networks. In today's packet switching networks, new messages are not excluded, but congestion leads to delays in transmission of packets to the network and further delays in transmitting packets through the network. This produces a reduction in bandwidth, eventually packets arriving in the wrong order because they have used different routes, and ultimately loss of packets.

Another alternative, for which standards exist, is to control the bandwidth using the available bit rate (ABR) protocol. Each sending application places resource management cells into the outgoing virtual circuit in addition to the conventional data cells. The resource management cells contain rate control information and are returned via a return virtual circuit to the sender. The network nodes monitor their own utilisation and in the event of congestion or some other inability to deal with the rate demanded by the resource management cells process them to indicate a lower rate. On receipt of the amended resource management cells, the sending application is contracted to reduce the rate to that specified in the amended cells.

European Patent Application 0526118 A2 to Motorola discloses a communication system which dynamically calculates a call rate between two callers which is dependent on the system loading. The rate is transmitted to the callers who can choose to terminate the call if the call rate increases, and re-establish the call when the rate falls.

U.S. patent application Ser. No. 5,420,914 to Blumhardt discloses a method and system for real time selection of inter-exchange telephone carriers for a telephone call, and is designed to select the cheapest carrier and route for a call for the given time of day.

U.S. patent application Ser. No. 5,148,474 to Haralambopoulos discloses an interactive telecommunication system including automatic billing which allows a user to verify a call including the rate before establishing it.

U.S. patent application Ser. No. 5,065,393 to Sibbit discloses a system for controlling the cross-connect fields of a multi-locational switch network from a single location and to monitor reserved call time for each user on a link-by-link as well as link duration basis.

In inventive system, all applications are treated equally. The invention is based on the recognition that equal treatment may not make the most effective use of the network in the sense that for some of the calls, bandwidth and short delay will be more important to the users than for others.

Against this background, there is provided a network for carrying variable bandwidth calls between entities and comprising a network resource which generates charges, said resource comprising means arranged to determine dynamically the charging rate for its use dependent on call bandwidth and total resource utilisation or congestion, and to transmit the charging rate or tariff data representing an actual, proposed or change in the charging rate through the network to the entity liable to the resource for the charges, and wherein said entity is arranged to change the bandwidth of a call in response to a change in the actual or proposed charge rate in accordance with predetermined connection and charging rate criteria.

In a preferred arrangement the network includes at least one resource in the form of a domain containing at least one transmission or switching element, and for which the share comprises bandwidth or bit rate.

When the network is congested, the invention enables it to operate more effectively in the sense that a higher proportion of the calls will have a high value to their user.

The charging rate or tariff may in some cases not result in the exchange of money or money's worth but could be used in, say a private, network, for internal audit or control purposes. In this case, the managers of the private network could, for instance, issue "tokens" to users shared out according to any priority scheme they wished. The users would use the tokens in a similar manner to using money to regulate their use of the communication system.

A domain in the network is a group of one or more network elements which generate charges for their use. Thus a call transmitted through some of the network elements of a domain will attract charges. It is proposed that the customers for whom wide bandwidth is more important may be willing to pay extra for it, while those for whom wide bandwidth is less important may prefer to reduce their bandwidth requirements so as to avoid extra payment or reduce their costs. The entity to which the tariff data is transmitted may be an end network element, if the domain is a local access network, or may be another domain. The tariff data may be altered at any time in response to commercial conditions and/or congestion in the domain, for example the price can be increased until congestion is controlled or merely to obtain the highest revenue for the domain.

Whether a domain passes the received call charges on to its own customer may depend on a managerial business decision. In one form of the invention, the tariff depends selectively also on charging rate or tariff data received from another domain.

The dynamic variation in the charging rate or tariff enables domains to compete with one another for traffic. To this end, the elements or domains are preferably able to select between alternative routes through the network, dependent on the charging rate or tariff data received from other network domains involved in transporting and providing services to the call.

In order for the ultimate customer to be able to make a decision, the network element liable for the call charges, may include an arrangement for displaying;

(a) the charging rate or tariff indicated respectively by the received charging rate or tariff data, or (b) the charging rate determined by, the tariff data.

The network element or elements liable for the call charges may additionally or alternatively include control means to control the transmission bandwidth of a call until the charging rate indicated by the received charging rate data, or the charging rate determined by the received tariff data, is equal to or less than a value determined by a set of predetermined criteria. Preferably the network element includes an arrangement for selecting different predetermined criteria. The network element also preferably includes means to override the control means selectively.

For each end network element there is preferably stored a class of service indicator, a local access network being arranged to determine the tariff dependent also on the class of service indicator. A user paying a low basic service fee (e.g. line rental) would be allocated a low class of service indicator and may have to pay premium charges for a high bandwidth call, at a lower level of congestion than would a user paying a higher line rental and who would be allocated a higher class of service indicator. Alternatively or additionally, the user having the lower class of service indicator may have to pay a higher premium for a high bandwidth call at the same level of congestion.

Thus the local access network may be arranged to calculate a utilisation indicator representing its own utilisation and wherein the tariff determination sets the charging rate to a value of zero when a combination of the value of the utilisation indicator and the value of the charging rate indicated by the received charging rate data, or determined by the received tariff data, is less than a level determined by the class of service indicator.

More generally, the network may include at least one resource in the form of a data processor, and for which the share comprises processor time slots.

The network may include at least one resource in the form of data storage, and for which the share of total domain utilisation of a call comprises volume of data.

The network may include at least one resource comprising a sales outlet for goods and/or service items in which each good or service item is offered for a set price, and in which the good or service item is paid for through the network by the purchaser accepting a high charging rate for a limited period.

The invention extends to a method of operating a network to carry variable bandwidth calls between entities, wherein network resources which generate charges dependent on call bandwidth and total resource utilisation or congestion, determine the charging rate for their use dynamically, and wherein charging rate or tariff data representing an actual proposed or change in the charging rate is transmitted through the network to the entity liable to the resource for the charges, and wherein said entity changes the bandwidth of the call in response to a change in the actual or proposed charging rate in accordance with predetermined connection and charging rate criteria.

Embodiments of the invention will now be described, by way of example, with reference to the accompanying drawings, in which.

Figure 1:
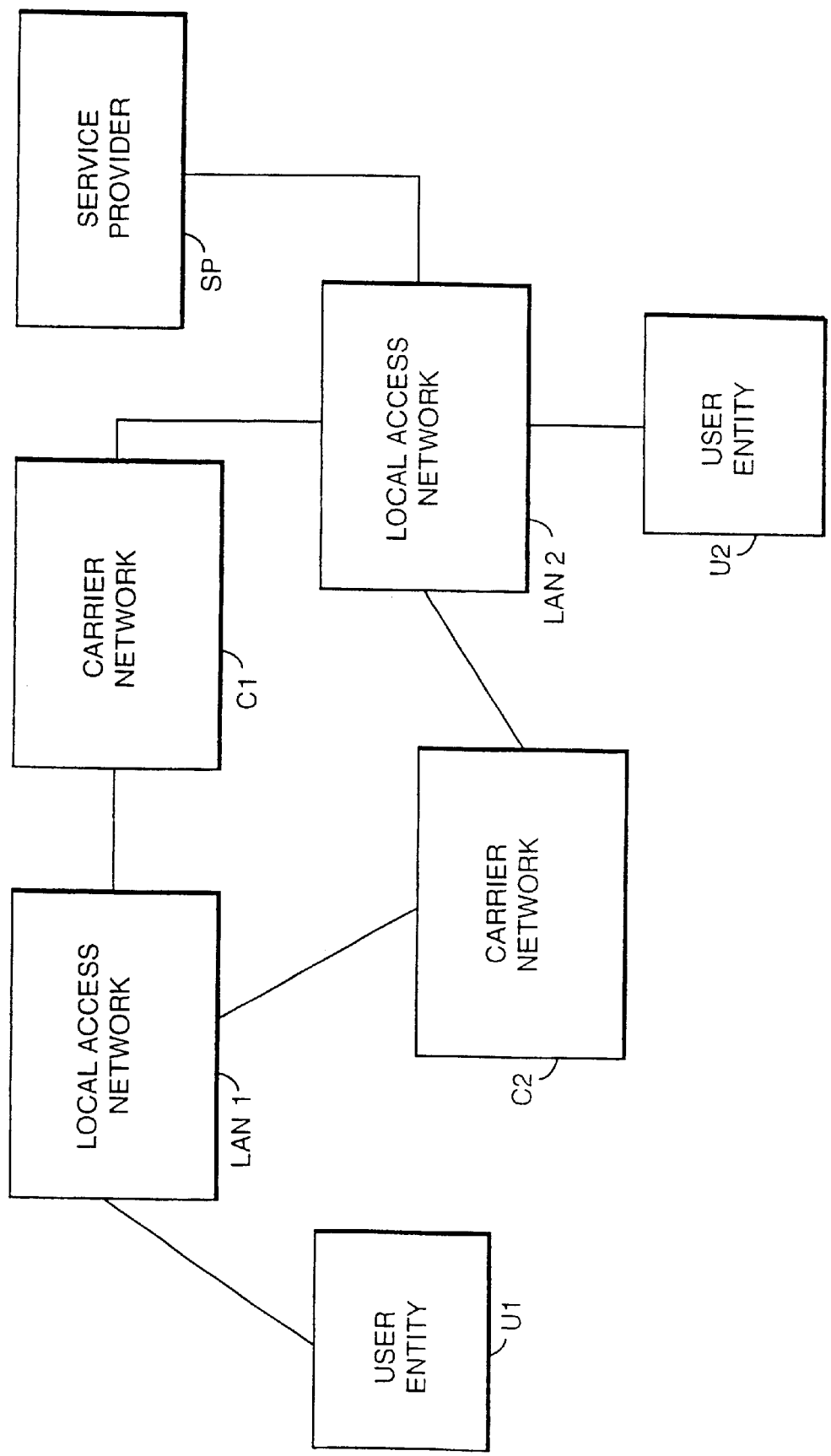
FIG. 1 is a schematic representation of a data communication network embodying the invention.

Referring to FIG. 1, the network comprises a number of entities. Users U1 and U2 are entities which may be connected to other entities by the network. Domains in the network are entities comprising a group of one or more network elements which generate charges for their use. Thus a call transmitted through some of the network elements of a domain will attract charges. A domain may include or consist of a service provider SP. Services may includes, for example, a public bulletin board, one or more data bases, the provision of films, a retail sales outlet etc. A domain may include or consist of transmission elements, switching networks etc. being, for example, a local access network LAN1 or LAN2 or a long distance carrier network C1 or C2.

Figure 2:
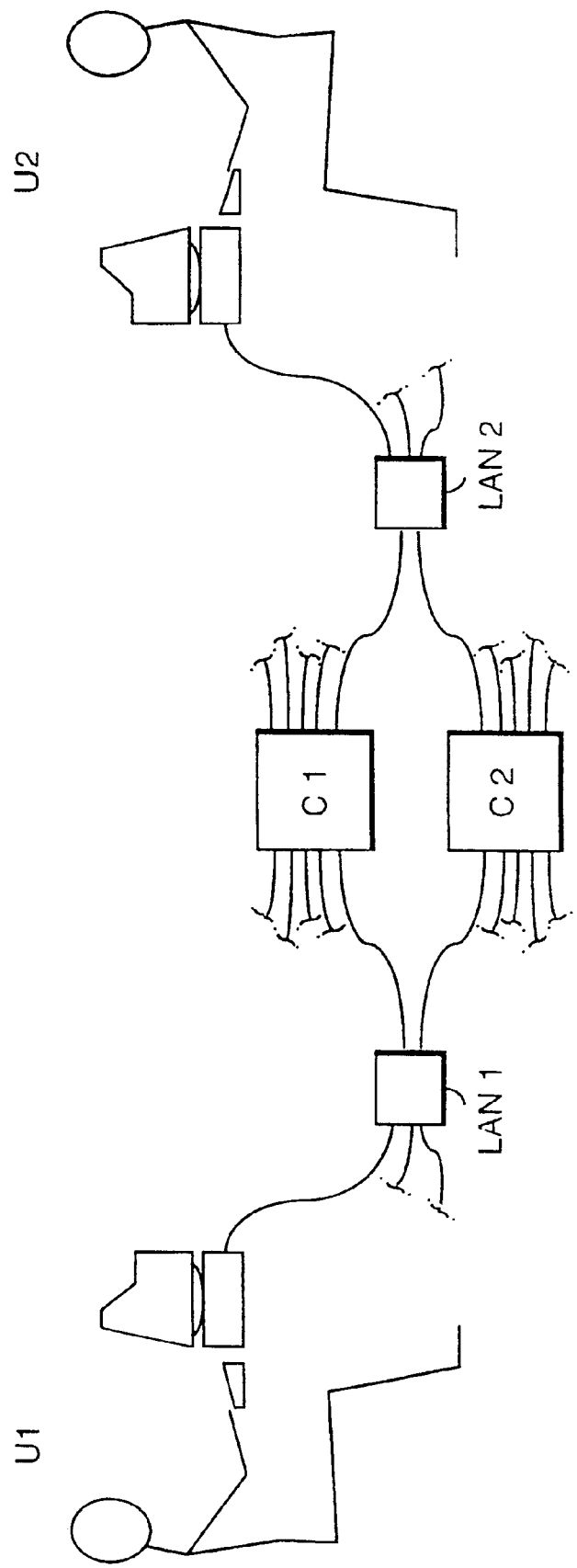
FIG. 2 is a schematic representation of a virtual circuit through the network of FIG. 1.

FIG. 2 illustrates a call between user U1 and user U2.

Communications between users U1 and U2 and their respective local access network LAN1 or LAN2 is in multiples of 64 kbit/s synchronous channels. Narrow band communications, requiring one 64 kbit/s channel may provide, for example a telephone call. Broader band circuits containing a plurality of 64 kbit/s channels may be required for rapid data communication and, are especially, for video. Video may be wanted for transmission of film or television type material or for video conferencing. To transmit voice plus video of VCR quality requires a bandwidth of about 2 Mbit/s. Voice plus poor quality video may be provided in a bandwidth of 128 kbit/s (2×64 kbit/s channels). That n×64 kbit/s data can be transferred by a stream of ATM cells or data packets.

The call may be carried between local access network LAN1 and local access network LAN2 by either carrier network C1 or C2.

Figure 3:
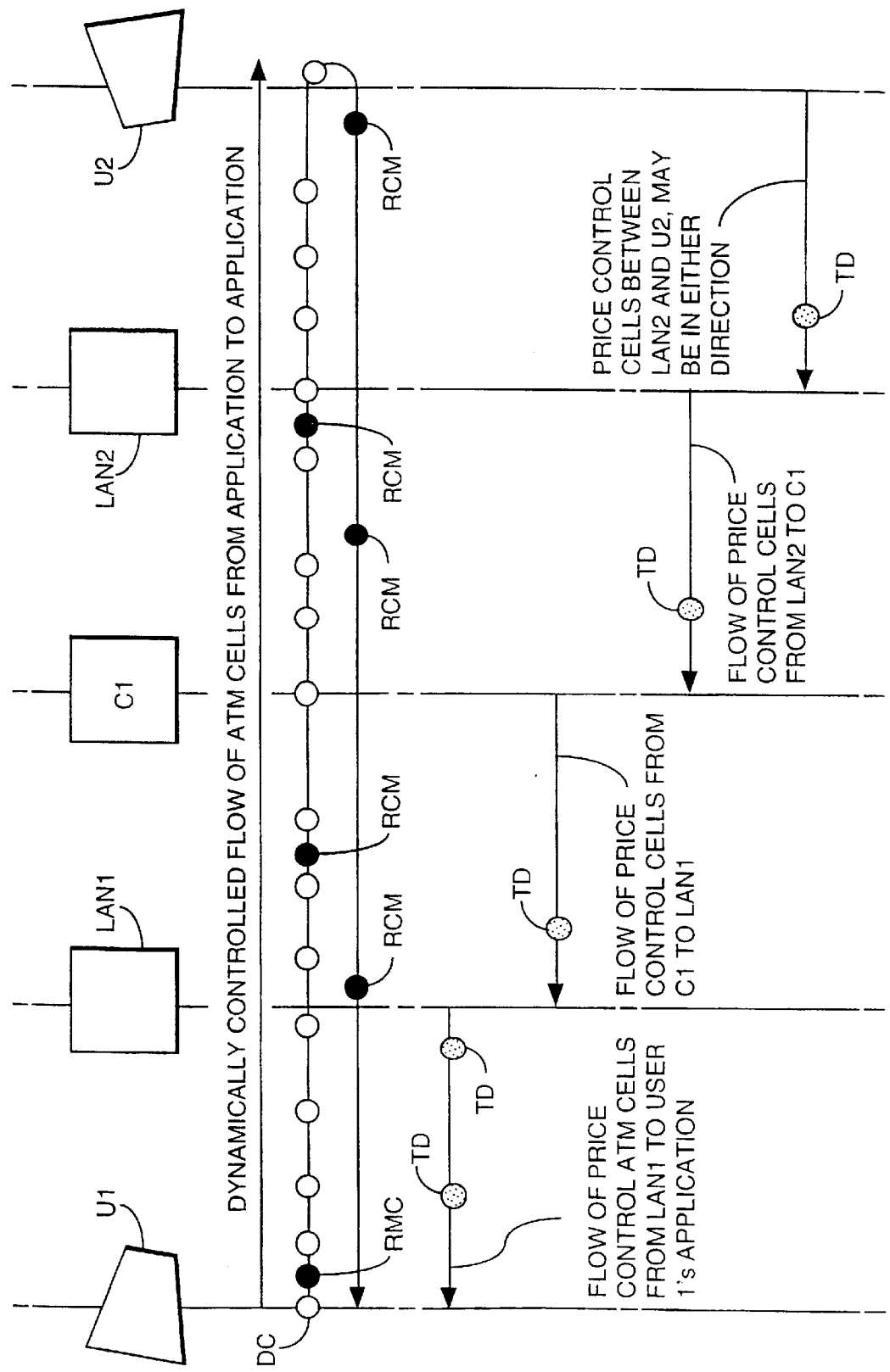
FIG. 3 is a schematic representation of data flow in the virtual circuit of FIG. 2.

Referring to FIG. 3, data cells DC which carry the information user U1 wants to convey to user U2 are transported along a virtual circuit through the ATM network and arrive with their order preserved and with delays acceptable to voice and video communication. Interspersed between the data cells DC, resource management cells RCM are sent over the same route as the virtual circuit. The resource management cells contain rate control information. In an n×64 kbit/s synchronous network, the resource and tariff management information would be sent over separate data channels using ISDN systems. In the standard ABR protocol, each domain which provides the virtual circuit monitors its own utilisation. In the event that the domain becomes unacceptably congested it processes the resource management cells to specify a lower rate. The resource management cells, having reached the application belonging to user U2, which may also process them to specify a lower rate, are returned on a return virtual circuit to the application belonging to user U1. The sending application belonging to user U1 is obliged to reduce the rate as specified.

This system of bandwidth control can remain in place in a network embodying the invention and would operate as an override in the event that large numbers of users decided they would pay the premium for broadband communication in the event of, for example, a major disaster.

In addition, or perhaps alternatively, the network determines the charging rate for a call dynamically, dependent on a tariff relating the charging rate to the bandwidth reserved for and/or utilised by the call. Before a call is set up, data representing a proposed charging rate determined from the tariff and the requested bandwidth, or the tariff, is transmitted from the domain to the entity or entities which will be liable for the charges for the call. The charging rate or tariff data may be sent in the resource management cells RMC or may be sent separately. Thus the resource management cells may be used to reserve bandwidth for a call and the charging rate may be based on that reservation. Alternatively, or additionally, the tariff may reflect the actual bandwidth used by the call, and may thus reflect that the call is using less or more than the reserved bandwidth. To this end the charging rate or tariff data is transmitted during the call at least when a change is proposed or made. The charging rate or tariff data is transmitted by each domain to the entity or entities liable for the charges for the service provided by that domain. The service would be transmitted through the domain in the case, say, of local access networks LAN1 and LAN2, and carrier networks C1 and C2. The service would relate to time logged on a database, for example, in the case of service provider SP. In some cases, the charging rate or tariff data will be transmitted towards the user originating the call. In other cases the charging rate or tariff data will be transmitted alternatively or additionally towards a service provider, e.g. in the provision of services similar to the 0800 type telephone services.

In general, transmitting data representing the tariff gives a user more information on which to base a decision regarding bandwidth usage. If, however, only charging rate data is transmitted, the user will know that use of more than one 64 kbit/s channel will normally be more expensive and can adjust the required bandwidth before call set up, or during a call, until a suitable charging rate is obtained or the use of only one channel is obtained.

The intention behind transmitting the information is to allow the domain manager to adjust the tariff in order to limit congestion or network elements in the domain. To this end, each user application is adapted to display the charging rate or tariff information so that the user liable for the costs of the call can terminate the call if the tariff is judged too high, or can limit the bandwidth used in the call and modify the rate control information in the resource management cells RMC. Alternatively, software in the application can make these decisions based on a priority scale pre-agreed with the user or users network provider.

Thus in FIG. 3, the entity comprising carrier network C1 is liable to the domain comprising local access network LAN2 for charges for the service by local access network LAN2 of transporting the data to user U2. Tariff data is therefore sent before establishment of the call from local access network LAN2 to carrier network C1. Local access network LAN2 may also charge for delivery to user U2, in which case tariff data (which may be different) is transmitted also from local access network LAN2 to user U2. A service provider SP may transmit tariff data to local access network LAN2. The tariff determined by the tariff data transmitted from local access network LAN2 to carrier network C1 may reflect the tariff determined by tariff data received by the local access network LAN2 from the user U2.

Similarly, the entity comprising local access network LAN1 is liable to the domain comprising carrier network C1 for the charges for the carriage of the call through the carrier network. Tariff data is therefore sent before establishment of the call from carrier network C1 to local access network LAN1. The tariff may reflect the tariff data received by the carrier network C1 from the local access network LAN2.

The entity comprising user U1 is liable to the domain comprising local access network LAN1 for the charges for the carriage of the call through the local access network. Tariff data is therefore sent before establishment of the call from carrier network C1 to local access network LAN1. The tariff may reflect the tariff data received by the local access network LAN1 from the carrier access network C1.

Tariff data may be transmitted from a domain to the entity which is liable to it during a call if the domain manager decides to vary the tariff. The tariff may be increased, for example, in response to mounting congestion in the domain, and may be increased progressively until congestion is controlled to an acceptable level. The tariff may be determined merely to maximise revenue to the domain, so that the domain may operate with a degree of congestion which its users are prepared to pay for.

The tariff determined by a domain may directly reflect congestion in the domain. Thus the degree of utilisation of the network elements may be directly related to the price, the tariff depending directly on the bandwidth reserved for or utilised by a call and the current utilisation of the network.

In addition to, or instead of, the display of the tariff by the application belonging to the users U1 and U2, each application may include an arrangement for allocating a degree of priority to a call based on a set of criteria. Increasing charging rates defined by the received tariff data may be accepted, dependent on the criteria, or the bit rate may be reduced when the criteria are not met. The criteria may include a maximum charging rate, for example, or an average maximum charging rate. The criteria may be that a predetermined charging rate is exceeded for more than a set time. There may be a number of predetermined sets of criteria which may be selected according to user priority.

The application may allow the criteria to be changed or overridden during a call.

This dynamic tariffing system can also be used to select the optimum route through a set of network elements or domains. To this end, in FIG. 2 LAN1 includes a route selection mechanism to choose the route to user U2. At call set-up, and during the call, LAN1 monitors tariffs on carrier network C1 and C2 and chooses the lowest cost route. This concept applied to an arbitrarily large set of network domains can lead to much greater network efficiency and cost effectiveness in a manner directly analogous to a free market economy.

As a further refinement, in order to assist an entity to access the likelihood of the cost of a call becoming unacceptable, the tariff data may include an indication of the rate of change predicted by a charge raising entity which may be contracted to limit the rate of change to the transmitted amount.

The dependency of the tariff data generated by a service provider will depend on the service. For example, if the service provider is a data store, the tariff will relate charging rate to the volume of data to be stored. As the store becomes fuller it will raise the charges in the tariff. As the store becomes less full it will lower the charges.

If the service provider provides films, for example, the tariff may relate the charging rate to the film so that more popular films may be charged at a higher rate than less popular ones. The tariff may be adjusted up or down according to the general business of the service provider so that the rates are lower late at night, when the service provider is less busy, and are higher at other times, e.g. in the evening when the service provider is busier.

The service provided may be data processing, in which case the tariff may relate the charging rate to the number of time slots required by a user process. Thus a user requiring more time slots would run its process more quickly than would a user requiring fewer time slots to run the same process. The service provider will increase the rates in the tariff accordingly as the data processing facility becomes busier and reduces the rates as the facility becomes less busy.

Some service providers may increase the rate massively for a short time e.g. one time unit. Charges are made at a rate of so much for a small unit of time, e.g. one second or one millisecond. A retail outlet publishes a tariff over the network in the form of a catalogue. A user selects an item from the tariff or catalogue and in order to charge the user, the service provider increases the charging rate to, say, the cost of the item for one time unit. The provision of a plurality of identical items is charged for by increasing the charging rate appropriately for a corresponding number of time units. In an alternative arrangement, the rate is increased for a plurality of time units, e.g. 10 to pay for one item. Records retrieved from databases could be charged for in the same way.

The arrangement means that the charge for an item is passed from the service provider SP, to local access network LAN2, from there to carrier network C1 or C2 and thence to local access network LAN1 eventually appearing on the user's network bill.

In order to avoid storage of masses of accounting information, local access network LAN2 includes means arranged to calculate and record the charges for individual calls between the two domains periodically every time unit from the charging rate or tariff data transmitted through the network. Service provider SP performs the same function. Both also calculate the total charge for calls between the two domains, and compare the total charge calculated by the domain SP with the total charge calculated by the domain LAN2. If there is agreement, or a suitably small difference, the records of charges for individual calls are destroyed. That process can take place throughout the network except normally at a local access network such as LAN1 in relation to charges which will be rendered to a user entity e.g. U1.

What is claimed is:

1. A network for carrying variable bandwidth calls between entities and comprising a network resource which generates charges, said resource comprising means arranged to determine dynamically the charging rate for its use dependent on at least one of call bandwidth, total resource utilisation and congestion, and to transmit the charging rate representing at least one of an actual charging rate, a proposed charging rate and a change in the charging rate through the network to the entity liable to the resource for the charges, wherein said entity is able to change the bandwidth of a call in response to the transmitted charging rate and to predetermined connection and charging rate criteria and wherein said network includes at least one resource in the form of a domain containing at least one of a transmission element and a switching element, and for which total domain utilisation of said element is related to at least one of bandwidth and bit rate.

2. A network as claimed in claim 1, further arranged to transmit the rate of change of charging rate to said liable entity.

3. A network as claimed in claim 1, wherein the charging rate is related to a share of the resource reserved for and/or utilised by the entity.

4. A network as claimed in claim 3, including at least one entity in the form of a data processor, and for which the share of total domain utilisation for a call comprises processor time slots.

5. A network as claimed in claim 3 or 4, including at least one resource in the form of data storage, and for which the share comprises volume of data.

6. A network as claimed in claim 1, including at least one resource comprising a sales outlet for goods and/or service items in which each good or service item is offered for a set price, and in which the good or service item is paid for through the network by the purchaser accepting a high charging rate for a limited period.

7. A network as claimed in claim 1, wherein the tariff depends selectively also on charging rate data received from another domain.

8. A network as claimed in claim 1, wherein the elements or domains choose between alternative routes through the network, dependent on the received charging rate or tariff data.

9. A network as claimed in claim 1, wherein a first domain raising charges and a second domain liable for the charges include means arranged each to calculate and record the charges for individual calls between the two domains periodically from the charging rate transmitted through the network; to calculate the total charge for calls between the two domains; and to compare the total charge calculated by the charge raising domain with the total charge calculated by the liable domain; and destroy the records of charges for individual calls dependent on the result of the comparison.

10. A network as claimed in claim 9, arranged to perform the comparison once in a plurality of periods.

11. A method of operating a network to carry variable bandwidth calls between entities, wherein a network resource which generates charges dependent on at least one of call bandwidth, total resource utilisation and congestion, determines the charging rate for its use dynamically, and wherein the charging rate representing at least one of an actual charging rate, a proposed charging rate and a change in the charging, rate is transmitted through the network to the entity liable to the resource for the charges, wherein said entity changes the bandwidth of a call in response to a change in the transmitted charging rate and predetermined connection and charging rate criteria, and wherein a resource in the form of a domain containing at least one of a transmission element and a switching element has its total domain utilisation measured with respect to at least one of its bandwidth and bit rate.

12. A method as claimed in claim 11, wherein the rate of change of charging rate is transmitted to said liable entity.

13. A method as claimed in claim 11, wherein the tariff relates the charging rate to a share of the resource reserved for and/or utilised by the entity.

14. A method as claimed in claim 13, wherein the network includes at least one resource in the form of a data processor, and for which the share comprises processor time slots.

15. A method as claimed in claim 13 or 14, wherein the network includes at least one resource in the form of data storage, and for which the share comprises volume of data.

16. A method as claimed in claim 11, wherein the network includes at least one resource comprising a sales outlet for goods and/or serviced items in which each good or service item is offered for a set price, and in which the good or service item is paid for through the network by the purchaser accepting a high charging rate for a limited period.

17. A method as claimed in claim 11, wherein the tariff depends selectively also on charging rate data received from another domain.

18. A method as claimed in claim 11, wherein the elements or domains select between alternative routes through the network, dependent on the received charging rate or tariff data.

19. A method as claimed in claim 11 or any preceding claim dependent thereon, wherein a first domain raising charges and a second domain liable for the charges each calculate and record the charges for individual calls between the two domains periodically from the charging rate transmitted through the network; calculate the total charge for calls between the two domains; and compare the total charge calculated by the charge raising domain with the total charge calculated by the liable domain; and destroy the records of charges for individual calls dependent on the result of the comparison.

20. A method as claimed in claim 19, wherein the comparison is performed once in a plurality of periods.

* * * * *